March 15, 1932. H. L. JOHNSTON 1,849,094
MIXING MACHINE
Filed Nov. 30, 1928 2 Sheets-Sheet 1

INVENTOR
Herbert L. Johnston
BY Maréchal & Noe
ATTORNEYS

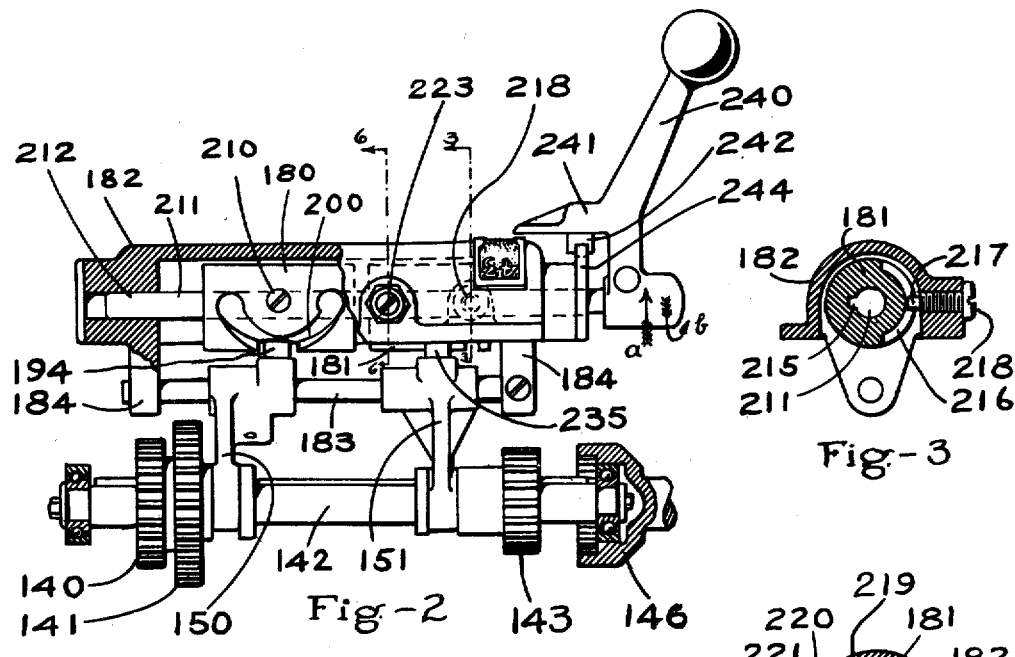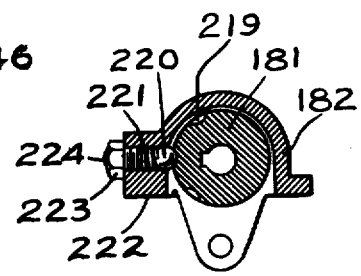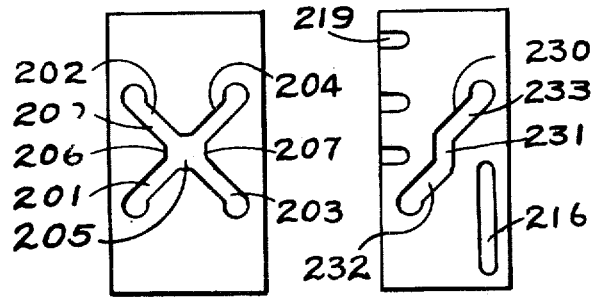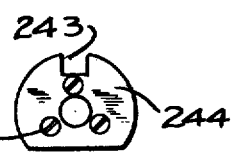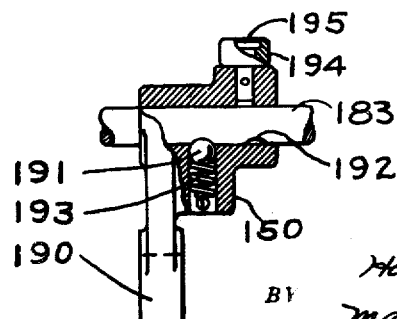

Patented Mar. 15, 1932

1,849,094

UNITED STATES PATENT OFFICE

HERBERT L. JOHNSTON, OF TROY, OHIO, ASSIGNOR TO THE HOBART MANUFACTURING COMPANY, OF TROY, OHIO, A CORPORATION OF OHIO

MIXING MACHINE

Application filed November 30, 1928. Serial No. 322,860.

This invention relates to mixing machines and particularly to machines for mixing foodstuffs such as bread dough and the like.

The primary object of the invention is the provision of a mixing machine of this character in which the speed of the mixing member may be readily controlled at various speeds of operation.

Other objects and advantages of the invention will be apparent from the following description when taken in connection with the accompanying drawings. In the drawings Fig. 1 is a side elevation of a mixing machine embodying the present invention, shown partly broken away to disclose the driving mechanism;

Fig. 2 is a fragmentary plan view of part of the change-speed operating mechanism;

Fig. 3 is a section on the line 3—3 of Fig. 2;

Fig. 4 is a developed view of one of the change-speed cams;

Fig. 5 is a developed view of the other change-speed cam;

Fig. 6 is a section on the line 6—6 of Fig. 2;

Fig. 7 is a detailed view of the gear-shift sector; and

Fig. 8 is a detailed view of a cam-operated gear-shifting arm shown partly in section.

Figure 1:
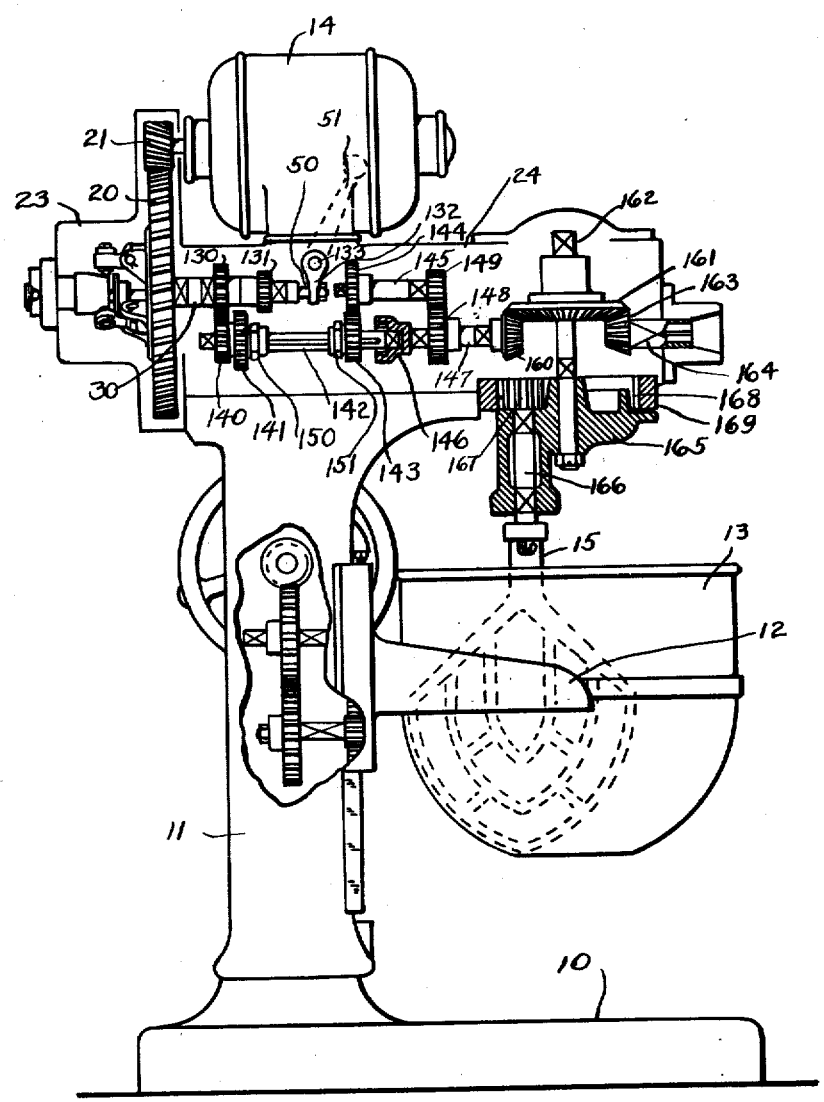

Referring more particularly to the drawings in which like characters of reference represent corresponding parts in the various figures, the machine is comprised essentially of a base 10 upon which is mounted the supporting pedestal 11 which holds the supporting table 12 in which is mounted the mixing bowl 13. At the upper part of the pedestal is the gearing or transmission mechanism by means of which the electric motor 14 is connected to the revolving mixing arm 15. Suitable operating mechanism is provided by means of which the operator is permitted to control the starting and stopping of the machine and to control the speed of operation thereof. Suitable means are also provided for raising and lowering the bowl along the pedestal so that it may be brought into cooperative relationship with the beater arm, or so that it may be readily removed from the supporting table to permit the ready removal of the cake dough, bread dough, or other material operated upon by the mixing arm. This case however is particularly concerned with the mechanism which effects the variation in speed of the mixing arm, being a division of my prior application for Letters Patent entitled Mixing machine, Serial No. 196,785, filed June 6, 1927.

The motor 14 drives the main gear 20 of the drive mechanism by means of a drive gear 21 fastened on the motor shaft. The gears 20 and 21 are contained within an end housing 23 which encloses the rear end of the main casing designated generally 24 in which is positioned the transmission mechanism of the machine. The main gear 20 is adapted to be operably connected to and operate a main drive sleeve 30 and is connected thereto by means of a suitable clutch which engages or disengages the main gear 20 with the drive sleeve 30. The operation of the clutch, as shown, is effected by means of a rod or shaft 50 which extends centrally through the drive sleeve 30 and which is adapted to be manually controlled by a clutch lever 51 suitably mounted at 133 upon a supporting shaft in a convenient accessible place. A fork 132 on the clutch lever 51 connects the latter to the operating rod or shaft 50.

The main drive sleeve 30 extends through a suitable partition separating the clutch chamber from the change-speed casing 24, extending into the main change-speed casing 24 where it is provided with the two gears 130 and 131, fixed to it in any suitable manner.

The two gears 130 and 131 are adapted to be selectively engaged with the two gears 140 and 141 which are splined or keyed for endwise movement adjacent one end of a countershaft 142 upon the other end of which is also keyed for endwise movement a third gear 143 which may either engage with a spur gear 144 on an auxiliary drive shaft 145 or may be engaged with a clutch member 146 on a lay shaft 147. The shaft 147 bears a gear 148 which meshes with a second gear 149 on the auxiliary shaft 145. The two gears 140 and 141 are adapted to engage with the two gears 130 and 131 in a selective manner so that the speed of the counter-shaft 142 may be changed in relation to the speed of the main drive sleeve 30. The lay shaft 147 is connected either through the gear train 143, 144, 149, and 148 to the counter-shaft 142, or it is connected directly through the direct engagement of the gear 143 with the internal teeth of the clutch member 146 so that the speed of the lay shaft 147 may be varied in relation to the speed of the counter-shaft 142. Consequently four adjustments in speed are provided for the lay shaft 147 in relation to the drive sleeve 30. The two gears 140 and 141 are moved endwise together by a gear-shifting bracket 150 and the gear 143 is moved by a gear-shifting bracket 151 in a manner to be presently described.

The shaft 147 carries at one end a bevel gear 160 which engages with a bevel gear 161 fixed on a vertical stub shaft 162, a second smaller bevel gear 163 being provided on a small stub shaft 164 as shown in Fig. 1. The vertical shaft 162 is rigid at its lower end with a rotatable plate 165 which supports a rotatable shaft 166 so that shaft 166 is carried eccentrically on the plate 165. A gear 167 at the upper end of the shaft 166 is rotated by internal teeth 168 provided on the fixed annular ring 169 of the housing. It is thus apparent that as the various drive shafts of the change-speed transmission mechanism are rotated the mixing arm 15 which is attached to the lower end of the shaft 166 is rotated and also moved bodily about the axis of the vertical shaft 162.

The gear-shift brackets 150 and 151, see Fig. 2, are controlled in a selective manner by the operation of two control cams 180 and 181 which are mounted in a support bracket 182 provided to one side of the shaft 50 and main drive sleeve 30. The two brackets 150 and 151 are slidably mounted upon a shaft 183 which is fastened to extending lugs 184 in the main bracket support 182. As shown more particularly in Fig. 8 the bracket 150 is provided with an extending arm 190 which controls the lateral movement of the two gears 140 and 141 the end of said arm being bifurcated to straddle a space attached to the cluster of gears, 140 and 141. A spring-pressed ball 191 is yieldingly held by spring 193 in engagement with one of a pair of concave depressions 192 in the rod 183 upon which the bracket is mounted. The position of the bracket 150 is thus yieldingly maintained for any of its positions of adjustment. At its upper portion the bracket bears a pin 195 on which is mounted a roller 194 which extends into a cam slot 200, the shape of which is shown developed in Fig. 4. This cam slot as shown has two rearwardly extending guideways 201 and 202 and two forwardly extending guideways 203 and 204. An enlarged central portion for the reception of the roller 194 is shown at 205. The cam 180 is fixed by means of a pin 210 to a supporting shaft 211 which is endwise movable and also rotatable within the journals 212 provided therefor at each end of the bracket 182. Endwise movement of the shaft 211 and cam 180 when the cam is in its neutral position, as shown in Fig. 2 is permitted to only a limited extent so that the roller 194 may be positioned against the rear or forward sides 206 or 207 of the central portion of the cam depression. After having been moved slightly forward or rearward from its central neutral position the shaft and the cam may be rotated together in either direction so as to cause the cam-operated roller 194 to move along one of the guideways 201, 202, 203, or 204, and thus cause a movement of the gear-shifting bracket 150 either to the left as the roller 194 moves in either the guideways 201 or 202, or to the right when it moves in the guideways 203 or 204.

The cam 181 is keyed to the control shaft 211 by means of the keyway 215 but the shaft 211 is permitted to move endwise within the cam while the cam is prevented from moving endwise. This cam is provided with a circular peripheral slot 216 in which engages a pin 217 provided by the inner end of a threaded dog pointed screw 218 which is fixed in place on the bottom of the main bracket 182 which supports the control shaft 211. The cam 181 is provided with a series of three concave depressions 219 within which a ball 220 is adapted to partially engage. The ball is pressed by means of a spring 221 provided in a lug 222 on the main bracket 182. A nut 223 threaded on the outer threaded end of a screw 224 maintains the spring 221 under suitable tension so that the ball 220 yieldingly retains the cam 181 in its various positions of adjustment. The cam 181 is provided with a cam surface or depression 230 which is shown developed in Fig. 5. This depression 230 consists of the central portion 231 and the two side guideways 232 and 233. The cam operated roller 235 provided at the upper end of the controlling bracket 151 is adapted to fit within the depression 230 of the cam 181 so that upon rotational movements of the cam the roller 235 will cause the bracket 151 to move to the right or to the left as the cam is rotated in one direction or the other and as the roller 235 is caused to engage with either the slot or guideway 232 or 233 as the case may be.

The two cams 180 and 181 as previously stated are mounted on the common control shaft 211 which extends parallel to the control rod or shaft 50 of the clutch control mechanism. Fixed to the outer projecting end of the control shaft 211 is a handle or control lever 240, which bears a projecting lugs 241 upon which is provided an inwardly extending tongue 242. This tongue may be received within a notch 243 in a plate 244 which is fastened by screws 245 to the end of the main support bracket 182. When the handle 240 is in a position shown in Fig. 2 the tongue 242 is received within the notch 243 of the plate so that rotational movements of the lever and of the control rod 211 are prevented. The control lever and rod may however be moved bodily back and forth a slight amount so as to position the operating roller 194 of control bracket 150 against either the side 206 or 207 of the central portion of the cam depression and at the same time move tongue 242 out of notch 243. When the control shaft 211 is moved to the left, see Fig. 2, a slight amount the control roller 194 engages the part 207 and then upon rotational movements of the control lever 240 in either direction the cam-operated bracket 150 will be caused to move to the right and thus cause the disengaging of the gears 130 and 140 and then cause the engagement of the gears 141 and 131 so as to change the speed of the counter-shaft in relation to the main drive sleeve 30. If the control rod 211 and the control handle 240 are rotated in the direction of the arrows "a" or "b" the cam-operated roller 235 of the control bracket 151 will be moved either to the right to cause the direct engagement of the counter-shaft with the clutch member 146 or to the left to cause the engagement of the gear 143 with the gear 144 on the auxiliary shaft 145. A movement of the control handle 240 to the right instead of to the left and then a rotational movement of this lever in one direction or the other will cause an opposite movement of the control bracket 150 while the movements of the control bracket 151 are governed in the same manner by rotational movements of the shaft 211 regardless of the longitudinal position of the control shaft. It will thus be apparent that four different speeds of rotation are provided for the driven shaft 147 with relation to the driving sleeve 30. The proper speed of operation may therefore be readily selected, dependent upon the particular character of the material being treated by the mixing arm, and as the proper gears have been engaged, the mixing arm may be started by engaging the clutch, assuming the motor 14 to be operating. If it is desired to increase the speed of operation of the mixing arm after the material has been partly jammed or mixed, this may be readily done by suitable operation of the clutch and gear-changing mechanism.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In a mixing machine of the class described, a driving means, a driven means, a counter-shaft between said means, gears on said counter-shaft to operate with said driving and driven means, a pair of control members for governing the movements of said gears, means for controlling each of said control members and a control device for moving said controlling means both in one direction, both in the other direction, or simultaneously in opposite directions.

2. In a machine of the class described, a drive shaft, a driven shaft, a counter shaft, gears on said shafts adapted to be engaged for varying the speed of said counter shaft in relation to said drive shaft and varying the speed of said counter shaft with relation to said driven shaft, a pair of control members for selecting said gears, a rotatable and endwise movable control shaft for operating said control members, a single control handle for effecting both rotary and endwise movement of said control shaft.

3. In a machine of the class described, a drive shaft, a driven shaft, a counter shaft, gears on said shafts adapted to be engaged for varying the speed of said counter shaft in relation to said drive shaft and varying the speed of said counter shaft with relation to said driven shaft, a pair of control members for selecting said gears, a rotatable and endwise movable control shaft, operating means therefor, control means on said control shaft for one of said control members, a second control means for the other control member, said control means being adapted to move said control members laterally, one of said control means having provision for moving a control member in either direction upon rotation of the control shaft in the same direction from a neutral rotative position in different positions of said control shaft.

4. In a machine of the class described, a change speed gear mechanism comprising driving and driven shafts, a counter shaft, selective gearing for varying the speed of the counter shaft with relation to the drive shaft, selective gearing for varying the speed of the counter shaft with relation to the driven shaft, a rotatable and endwise movable control shaft for said selective gearings, and a single operating means for effecting both rotary and endwise movement of said control shaft.

5. In a machine of the class described, a change speed gear mechanism comprising driving and driven shafts, a counter shaft, selective gearing for varying the speed of the counter shaft with relation to the drive shaft, selective gearing for varying the speed of the counter shaft with relation to the driven shaft, a control member for each said selective gearing, a control shaft mounted for rotational and axial movements, control means on said control shaft for moving one of said control members in opposite directions upon opposite rotation of said control shaft from a normal position, and an additional control means on said control shaft for moving the other control member in one direction upon rotation of said control shaft to a definite position and for moving said control member in the opposite direction upon rotation of said control shaft to the same definite position after axial movement of the control shaft.

6. In a machine of the class described, a hollow drive shaft, a counter shaft radially displaced therefrom, selective gearing for operating said counter shaft at different speeds with relation to the drive shaft, a driven shaft adjacent one end of and aligned with said counter shaft but spaced laterally therefrom, means for operating said hollow drive shaft, a control member for governing the driving interconnection between said operating means and said hollow drive shaft, said control member extending from the space intermediate said driven shaft and said drive shaft through said hollow drive shaft, and selective gearing for directly connecting said counter shaft and driven shaft and for indirectly connecting said counter shaft and driven shaft.

7. In a machine of the class described, a drive shaft, a counter shaft radially displaced therefrom, change speed gearing between said drive shaft and said counter shaft, a driven shaft, a second counter shaft radially displaced with respect to said first counter shaft and said driven shaft, change speed gearing interconnecting said first mentioned counter shaft directly with said driven shaft and indirectly through said second counter shaft with said driven shaft for rotational movement of the driven shaft in the same direction at different speeds, and a single controlling member for operating said several change speed gearings.

8. In a machine of the class described, a change speed gear mechanism comprising driving and driven shafts, the driven shaft being radially displaced from the driving shaft, a counter shaft radially displaced with respect to said drive shaft and aligned with said driven shaft, selective gearing for varying the speed of the counter shaft with relation to the drive shaft, a control member therefor, selective gearing for varying the speed of the counter shaft with relation to the driven shaft, a control member therefor, and a single control means for operating both said control members.

9. In a machine of the class described, a change speed gear mechanism comprising driving, driven and counter shafts, and having two gear sets, gear selecting means comprising two cam members for shifting the two gear sets and a single control shaft movable endwise for moving only one cam member while moving relatively to the other cam member and rotatable for moving both cam members.

10. In a machine of the class described, a change speed gear mechanism comprising driving, driven and counter shafts, two gear sets for said shafts, and control means for simultaneously engaging both of said gear sets comprising two cam members adapted to simultaneously shift the two gear sets, and control means for said cam members, said control means including an endwise movable shaft having provision for moving one cam without moving the other.

11. In a machine of the class described, a change speed gear mechanism comprising driving, driven and counter shafts, two gear sets for said shafts, and control means for simultaneously engaging both of said gear sets comprising two rotatable cam members for simultaneously shifting the two gear sets, a rotatable shaft supporting both said cam members, means operably interconnecting one cam member to said shaft for rotational movement with said shaft and for axial movement relative to said shaft, and means rigidly fixing the other cam member to said shaft.

12. In a machine of the class described, a change speed gear mechanism comprising driving and driven shafts, change speed gear mechanism operably interconnecting said shafts, a single control member for varying the speed ratio of said shafts comprising a rotatable and endwise movable control shaft, gear shifting means for said change speed gearing, and means operably interconnecting said control shaft with said gear shifting means such that said control shaft is adapted to be moved either clockwise or counter clockwise to provide for two speed ratios and is adapted to be moved endwise and rotated either clockwise or counter clockwise to provide two more speed ratios.

13. In a machine of the class described, a change speed gear mechanism comprising driving and driven shafts, change speed gear mechanism operably interconnecting said shafts, a single control member for varying the speed ratio of said shafts comprising a rotatable and endwise movable control shaft, a plurality of gear shifting means for said change speed gearing, cam means operably interconnecting said control shaft with said plurality of gear shifting means such that said control shaft is adapted to be moved either clockwise or counter clockwise to provide for two speed ratios and is adapted to be moved endwise and rotated either clockwise or counter clockwise to provide two more speed ratios, and means yieldingly holding said control shaft in any of its several positions.

14. In a machine of the class described, a drive shaft, a driven shaft, change speed gear mechanism operably interconnecting said shafts and comprising two gear sets adapted for simultaneous shifting movements, a cam member for operating each of said gear sets, a control shaft for both said cam members, means mounting said control shaft for rotational and for axial movements, means for operating said control shaft either clockwise or counter clockwise and for moving it axially, and means operably interconnecting said control shaft with both of said cam members, such that said control shaft is adapted to be rotated either clockwise or counterclockwise to provide two speeds and is adapted to be moved endwise and rotated either clockwise or counter clockwise to provide two more speeds.

15. In a machine of the class described, a change speed gear mechanism comprising driving, driven and counter shafts, a plurality of gear sets for said shafts, a single control member adapted to be rotated and axially moved, means for operably interconnecting said control member with said gear sets for moving said gear sets to provide two different speeds when said control member is moved clockwise or counter clockwise from a neutral rotative position and for providing two more speeds when said control member is moved endwise in said neutral rotative position and rotated either clockwise or counter clockwise from said neutral rotative position, and means preventing the endwise movement of said control shaft except when it is in said neutral rotative position.

16. In a machine of the class described, a change speed gear mechanism comprising a drive shaft, a counter shaft radially displaced therefrom, a driven shaft in axial alignment with said counter shaft, a second counter shaft in approximate alignment with said drive shaft and spaced somewhat from the end of the drive shaft, movable gear sets for said various shafts for obtaining various speeds of the driven shaft, a clutch operating lever positioned within the space between the drive shaft and the second counter shaft, and a clutch operating connection extending through one of said shafts.

17. In a machine of the class described, a drive shaft, a driven shaft, change speed gear mechanism operably interconnecting said shafts, gear shifting means therefor, a control member for varying the speed ratio of said shafts including a rotatable and axially movable control shaft, a cam member operably connected to said control shaft, and means interconnecting said cam member and said gear shifting means such that rotation of said control shaft in one axial position thereof effects movement of said gear shifting means in one direction, and rotation in the same direction in another axial position of said control shaft effects movement of said gear shifting means in another direction.

18. In a machine of the class described, a drive shaft, a driven shaft, change speed gear mechanism operably interconnecting said shafts, gear shifting means therefor, a control member for varying the speed ratio of said shafts including a rotatable and axially movable control shaft, a cam member operably connected to said control shaft, and means interconnecting said cam member and said gear shifting means such that clockwise rotation of said control shaft in one axial position thereof effects movement of said gear shifting means in one direction, counterclockwise rotation of said control shaft in said one axial position effects movement of said gear shifting means in an opposite direction, clockwise rotation of said control shaft in another axial position effects movement of said gear shifting means in said opposite direction, and counterclockwise rotation of said control shaft in said other axial position effects movement of said gear shifting means in said first mentioned direction.

19. In a machine of the class described, a drive shaft, a driven shaft, means operably interconnecting said shafts including two shiftable gear sets, a single control member for varying the speed ratio of said shafts including a rotatable and axially movable control shaft, two cam members, means operably interconnecting one cam member to said control shaft for rotational movement with said shaft and for axial movement relative to said shaft, means operably interconnecting said other cam member to said control shaft for both rotational and axial movements with said control shaft, two gear shifting means for said gear sets, and means operably interconnecting each gear shifting means with its respective cam member such that rotative movement of said control shaft in one axial position effects simultaneous movement of said two gear shifting means in the same direction, and rotative movement in the same direction of said control shaft in another axial position effects simultaneous movement of said two gear sets in different directions.

20. In a machine of the class described, a drive shaft, a driven shaft, change speed gearing operably interconnecting said shafts, gear shifting means for said change speed gearing, a control means for said gear shifting means including a rotatable and axially movable control shaft, a member carried by said control shaft to rotate and move axially therewith, and interconnecting means between said member and said gear shifting means having provisions to effect gear shifting movement of said gear shifting means upon rotational movement of said control shaft, and to provide relative movement between said member and said gear shifting means upon axial movement of said control shaft to thereby permit axial movement of said member with said control shaft without effecting gear shifting movement of said gear shifting means.

21. In a machine of the class described, a drive shaft, a driven shaft, change speed gearing operably interconnecting said shafts, gear shifting means for said change speed gearing, a control means having a neutral position for said gear shifting means including a rotatable and axially movable control shaft, operative interconnections between said control shaft and said gear shifting means adapted to effect gear shifting movement of said gear shifting means upon rotational movement of said control shaft, and to move said gear shifting means to a position disengaging said change speed gearing when said control shaft is rotated to a neutral rotative position, and means preventing axial movement of said control shaft except when the control shaft is in said neutral rotative position and the change speed gearing is disengaged.

In testimony whereof I hereto affix my signature.

HERBERT L. JOHNSTON.

CERTIFICATE OF CORRECTION.

Patent No. 1,849,094.  Granted March 15, 1932, to

HERBERT L. JOHNSTON.

It is hereby certified that error appears in the printed specification of the above numbered patent requiring correction as follows: Page 2, line 127, for "lugs" read lug; page 3, line 85, claim 2, before the article "a" insert the word and, and line 105, claim 3, after the word "different" insert the word lateral; and that the said Letters Patent should be read with these corrections therein that the same may conform to the record of the case in the Patent Office.

Signed and sealed this 26th day of April, A. D. 1932.

(Seal)

M. J. Moore,
Acting Commissioner of Patents.

effecting gear shifting movement of said gear shifting means.

21. In a machine of the class described, a drive shaft, a driven shaft, change speed gearing operably interconnecting said shafts, gear shifting means for said change speed gearing, a control means having a neutral position for said gear shifting means including a rotatable and axially movable control shaft, operative interconnections between said control shaft and said gear shifting means adapted to effect gear shifting movement of said gear shifting means upon rotational movement of said control shaft, and to move said gear shifting means to a position disengaging said change speed gearing when said control shaft is rotated to a neutral rotative position, and means preventing axial movement of said control shaft except when the control shaft is in said neutral rotative position and the change speed gearing is disengaged.

In testimony whereof I hereto affix my signature.

HERBERT L. JOHNSTON.

CERTIFICATE OF CORRECTION.

Patent No. 1,849,094.   Granted March 15, 1932, to

HERBERT L. JOHNSTON.

It is hereby certified that error appears in the printed specification of the above numbered patent requiring correction as follows: Page 2, line 127, for "lugs" read lug; page 3, line 85, claim 2, before the article "a" insert the word and, and line 105, claim 3, after the word "different" insert the word lateral; and that the said Letters Patent should be read with these corrections therein that the same may conform to the record of the case in the Patent Office.

Signed and sealed this 26th day of April, A. D. 1932.

(Seal)

M. J. Moore,
Acting Commissioner of Patents.

CERTIFICATE OF CORRECTION.

Patent No. 1,849,094. Granted March 15, 1932, to

HERBERT L. JOHNSTON.

It is hereby certified that error appears in the printed specification of the above numbered patent requiring correction as follows: Page 2, line 127, for "lugs" read lug; page 3, line 85, claim 2, before the article "a" insert the word and, and line 105, claim 3, after the word "different" insert the word lateral; and that the said Letters Patent should be read with these corrections therein that the same may conform to the record of the case in the Patent Office.

Signed and sealed this 26th day of April, A. D. 1932.

(Seal)

M. J. Moore,
Acting Commissioner of Patents.